(12) United States Patent
Chen et al.

(10) Patent No.: US 10,966,539 B2
(45) Date of Patent: Apr. 6, 2021

(54) RECIPROCATING DEVICE

(71) Applicant: Ko-Po Chen, Taichung (TW)

(72) Inventors: Ko-Po Chen, Taichung (TW);
Meng-Lung Fang, Taichung (TW)

(73) Assignee: Ko-Po Chen, Taichung (TW)

( * ) Notice: Subject to any disclaimer, the term of this patent is extended or adjusted under 35 U.S.C. 154(b) by 106 days.

(21) Appl. No.: 16/437,253

(22) Filed: Jun. 11, 2019

(65) Prior Publication Data

US 2020/0390246 A1    Dec. 17, 2020

(51) Int. Cl.
| | |
|---|---|
| *F16H 7/00* | (2006.01) |
| *A47C 21/00* | (2006.01) |
| *F16H 7/02* | (2006.01) |
| *F16H 21/18* | (2006.01) |

(52) U.S. Cl.
CPC ............ *A47C 21/006* (2013.01); *F16H 7/02* (2013.01); *F16H 21/18* (2013.01)

(58) Field of Classification Search
CPC .............................. A47C 21/00; A47C 21/006
USPC .............................. 248/559, 637; 5/108, 109
See application file for complete search history.

(56) References Cited

U.S. PATENT DOCUMENTS

| | | | | |
|---|---|---|---|---|
| 1,733,115 | A * | 10/1929 | Capito ..................... | A47D 9/02 5/109 |
| 4,586,492 | A * | 5/1986 | Manahan ............... | A61H 1/003 5/109 |
| 6,155,976 | A * | 12/2000 | Sackner ............... | A47C 21/006 5/600 |
| 6,209,157 | B1 * | 4/2001 | Hensley ............... | A47C 20/041 5/613 |
| 7,404,221 | B2 * | 7/2008 | Sackner ................ | A61H 1/006 5/109 |
| 8,863,325 | B1 * | 10/2014 | Fiterson ................ | A61H 1/001 5/5 |

FOREIGN PATENT DOCUMENTS

TW           M400790 U       4/2011

* cited by examiner

*Primary Examiner* — Steven M Marsh
(74) *Attorney, Agent, or Firm* — Alan D. Kamrath; Karin L. Williams; Mayer & Williams PC (57) ABSTRACT

The present disclosure provides a reciprocating device which includes a base, a moving frame, a shaking unit, an adjustment unit, and a driving unit. The moving frame can reciprocate relative to the base. The shaking unit has a shaking assembly and a driven assembly. The shake of the shaking assembly enables the driven assembly to move, and the movement of the driven assembly enables the moving frame to reciprocate relative to the base. The adjustment unit has an adjustment assembly and a power member. The power member drives the adjustment assembly to change the position thereof, and the positional change of the adjustment assembly alters the way that the shaking assembly shakes to adjust the reciprocating range of the moving frame. Therefore, the moving frame of the present invention can reciprocate and the reciprocating range of the moving frame can be adjusted according to the user's preference, so that the present invention can help a user sleep and improve sleep quality.

10 Claims, 8 Drawing Sheets

FIG. 11

RECIPROCATING DEVICE

RELATED APPLICATIONS

Field of the Invention

The present disclosure relates to a reciprocating device, and the reciprocating range of the reciprocating device can be adjusted.

Background of the Invention

People are prone to insomnia or poor sleep quality due to the stress of heavy work and fast-paced life, so that human health may be affected because people cannot regain the vitality through sleep. Therefore, a bed frame with a regularly movement is developed to improve sleep quality.

The electric bed of TW Pat. No. M400790 which is previously filed by the applicant includes a sliding frame which is slidably disposed upon a base through several roller sets, and a bed frame is disposed upon the sliding frame to slide along with the sliding frame. A driving apparatus is located between the base and the sliding frame, and the driving apparatus drives the sliding frame to slide backwards and forwards to improve sleep quality. However, when a user feels that the sliding ranges of the sliding frame and the bed frame are too large or too small, the user cannot adjust the sliding ranges of the sliding frame and the bed frame, so that the electric bed cannot efficiently improve sleep quality.

The present invention is, therefore, arisen to obviate or at least mitigate the above mentioned disadvantages.

SUMMARY OF THE INVENTION

One of the objects of the present invention is to provide a reciprocating device, and the reciprocating range of the reciprocating device can be adjusted according to a user's preference to improve sleep quality.

To achieve the above and other objects, the present invention provides a reciprocating device. The reciprocating device of the present invention includes a base, a moving frame, a shaking unit, an adjustment unit, and a driving unit. The moving frame can reciprocate relative to the base. The shaking unit has a shaking assembly and a driven assembly. The shaking assembly has a shaft, a first shaking portion, a second shaking portion, and a third shaking portion. The shaft passes through the first shaking portion. The driven assembly which is disposed on the moving frame is pivotally connected to the second shaking portion. The shake of the shaking assembly enables the driven assembly to move, and the movement of the driven assembly enables the moving frame to reciprocate relative to the base. The adjustment unit has an adjustment assembly and a power member. The adjustment assembly which is connected to the power member is pivotally connected to the third shaking portion of the shaking assembly. The power member drives the adjustment assembly to change the position thereof, and the positional change of the adjustment assembly alters the way that the shaking assembly shakes to adjust the reciprocating range of the moving frame. The driving unit drives the shaft to rotate, and the rotation of the shaft enables the first shaking portion to move.

In some embodiments, the reciprocating device further includes a supporting member which is connected to the base and the moving frame.

In some embodiments, the positions of the first shaking portion, the second shaking portion, and the third shaking portion are arranged in a triangle.

In some embodiments, the shaft is an eccentric shaft, and the rotation of the shaft enables the first shaking portion to perform a circular motion around the rotary axis of the shaft.

In some embodiments, the driving unit includes a motor and a pulley belt set.

In some embodiments, the power member is a linear actuator, and the reciprocating range of the moving frame is increased when the power member stretches.

In some embodiments, the driven assembly has a first driven member and a second driven member, the first driven member is pivotally connected to the second shaking portion and the second driven member, and one end of the second driven member is disposed on the moving frame.

In some embodiments, the reciprocating device further includes a plate member, and the adjustment assembly has a first adjustment member and a second adjustment member. The first adjustment member has a fixing portion which is pivotally connected to the plate member and a linking portion which is connected to the power member. The first adjustment member pivots on the fixing portion when the linking portion is driven by the power member, and the power member can drive the adjustment assembly to pivot toward the underneath of the shaking unit. The second adjustment member has a swing portion which is pivotally connected to the third shaking portion and a shifting portion which is pivotally connected to the first adjustment member, so that the second adjustment member can pivot on the shifting portion when the shaking assembly shakes, and the first adjustment member brings the shifting portion of the second adjustment member to move together when the first adjustment member pivots on the fixing portion.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

The present disclosure can be more fully understood by reading the following detailed description of the embodiment, with reference made to the accompanying drawings as follows.

DETAILED DESCRIPTION OF THE PREFERRED EMBODIMENTS

The present invention provides a reciprocating device, and the reciprocating range of the reciprocating device can be adjusted. Please refer to FIG. 1, the present embodiment reveals a reciprocating device that includes a base 10, a moving frame 20, several supporting members 30, a shaking unit 40, an adjustment unit 50, a driving unit 60, and two plate members 70.

Figure 1:
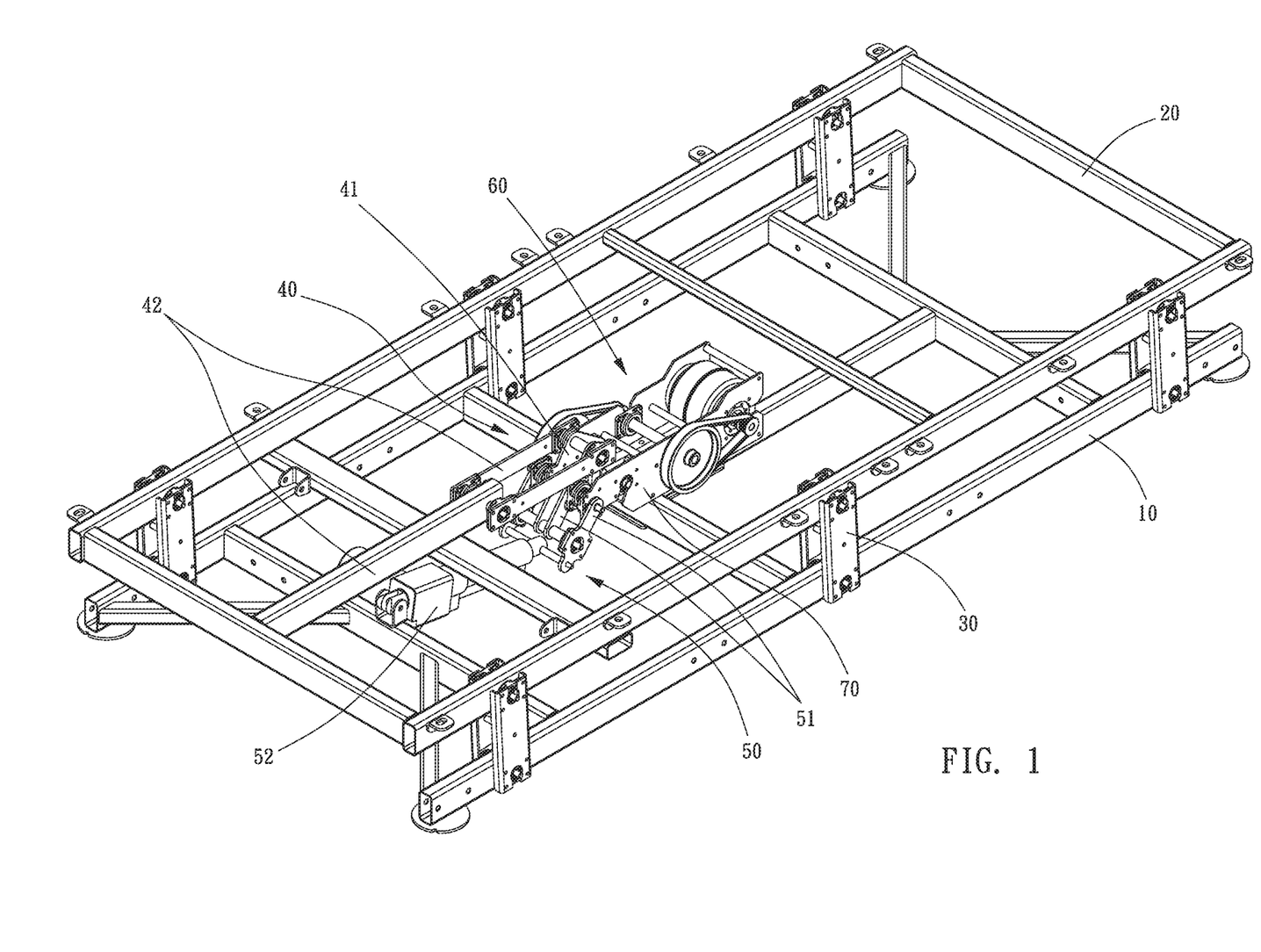
FIG. 1 is a stereogram showing an embodiment of the present invention.

The base 10 is a rectangular frame which is composed of several rods. The moving frame 20 is located upon the base 10, and the moving frame 20 is also a rectangular frame which is composed of several rods. Specifically, a bed board and a mattress can be placed on the moving frame 20 for a user to lie thereon.

Several supporting members 30 are located between and connected to the base 10 and the moving frame 20. The supporting member 30 is a rod. The bottom end of the supporting member 30 is pivotally connected to the base 10, and the top end of the supporting member 30 is pivotally connected to the moving frame 20.

Please refer to FIG. 1 to FIG. 4. The shaking unit 40 has a shaking assembly 41 and a driven assembly 42.

Figure 2:
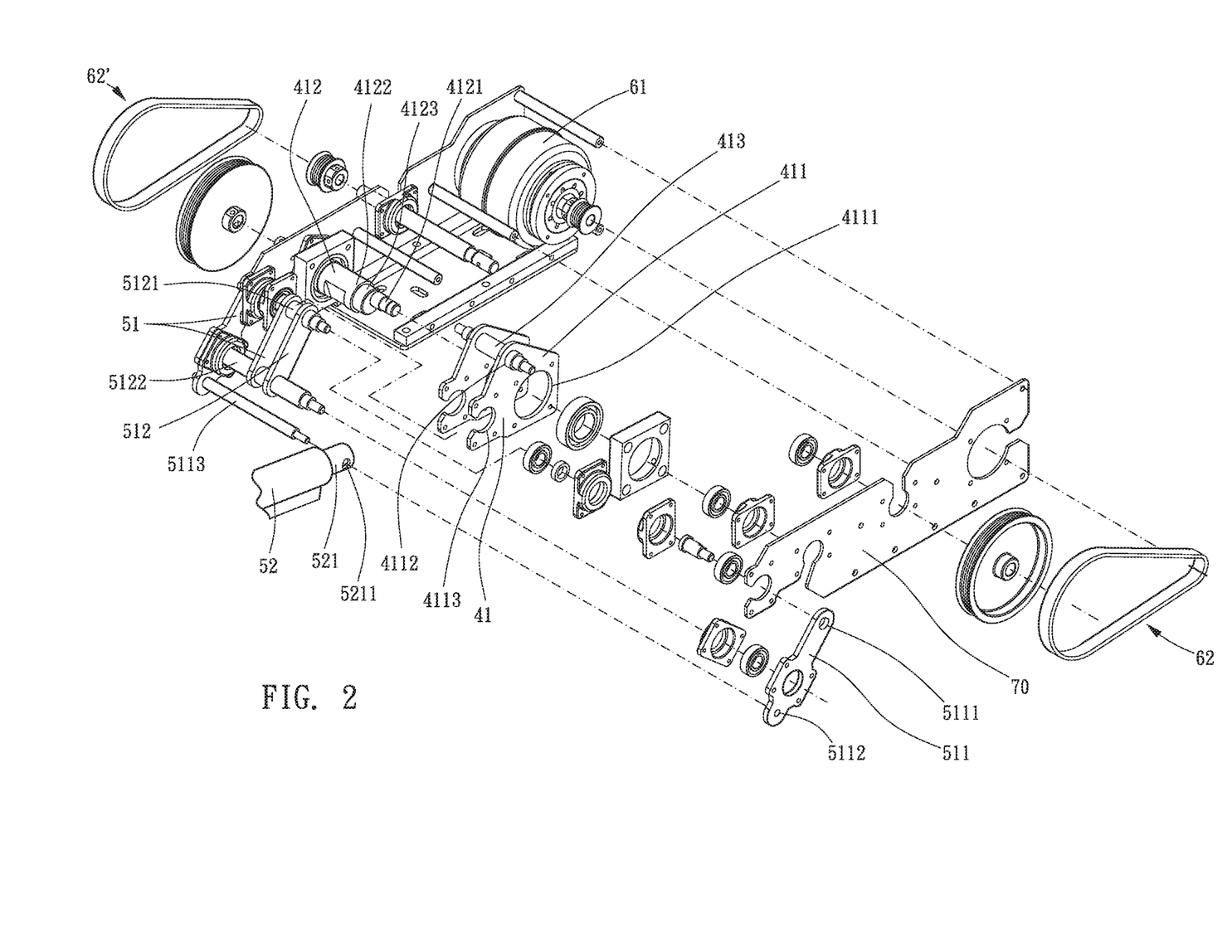
FIG. 2 and FIG. 3 are breakdown drawings showing the embodiment of FIG. 1.

The shaking assembly 41 has two shaking plates 411, a shaft 412, and a fixing axle 413. As shown in FIG. 2, two shaking plates 411 is parallel to each other, and the shaking plate 411 has a first shaking portion 4111, a second shaking portion 4112, and a third shaking portion 4113. Each of the shaking portions 4111, 4112, 4113 is a hole. The positions of the first shaking portion 4111, the second shaking portion 4112, and the third shaking portion 4113 are arranged in a triangle. The shaft 412 is an eccentric shaft, and the shaft 412 has a rotary section 4121 and an eccentric section 4122. Both ends of eccentric section 4122 has the connecting sub-sections 4123, and the diameter of the connecting sub-section 4123 is smaller than the diameter of the eccentric section 4122. The shaft 412 passes through the first shaking portion 4111, and the first shaking portion 4111 is pivotally connected to the connecting sub-section 4123 by a bearing. The fixing axle 413 passes through the second shaking portion 4112.

Figure 3:
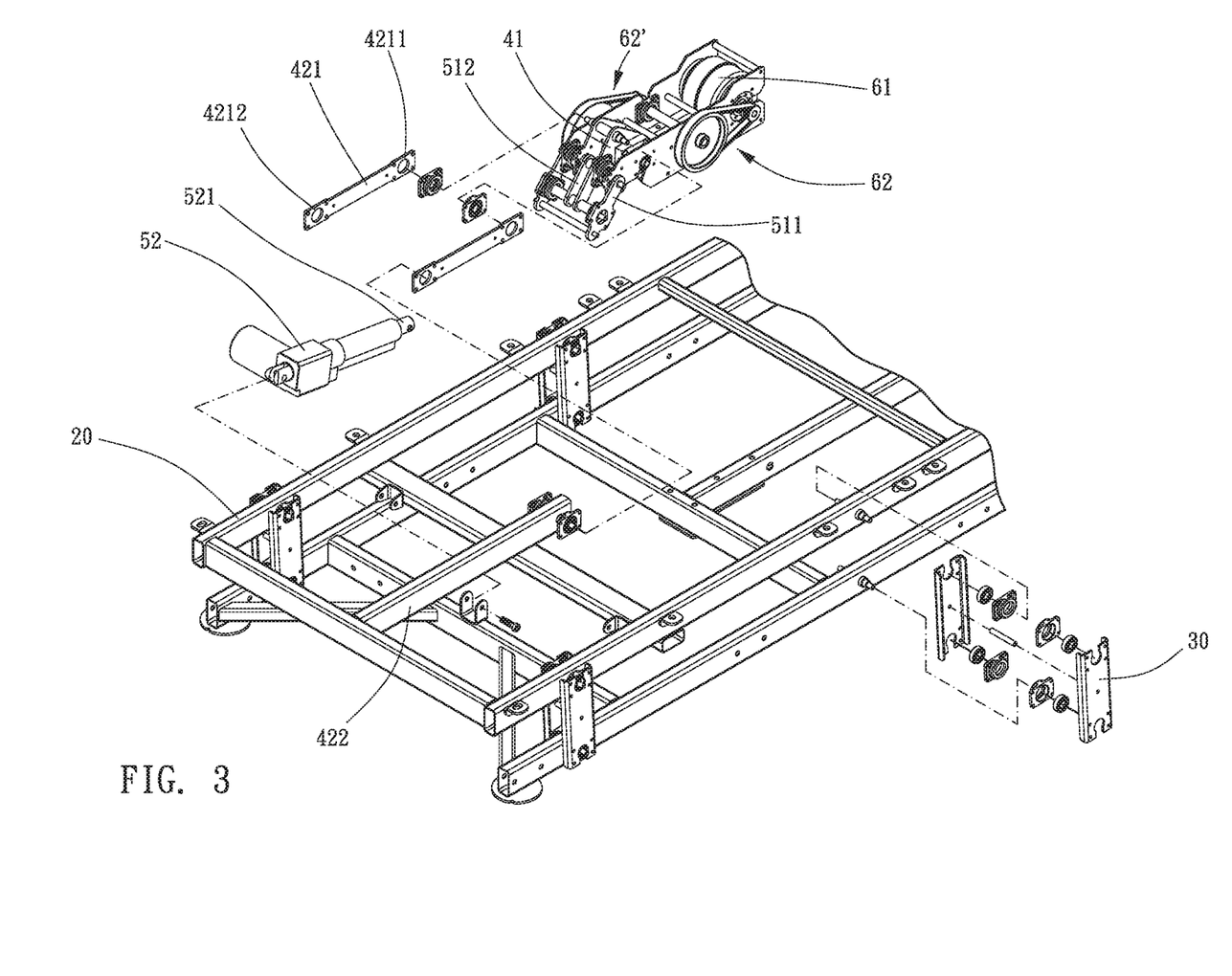
Figure 4:
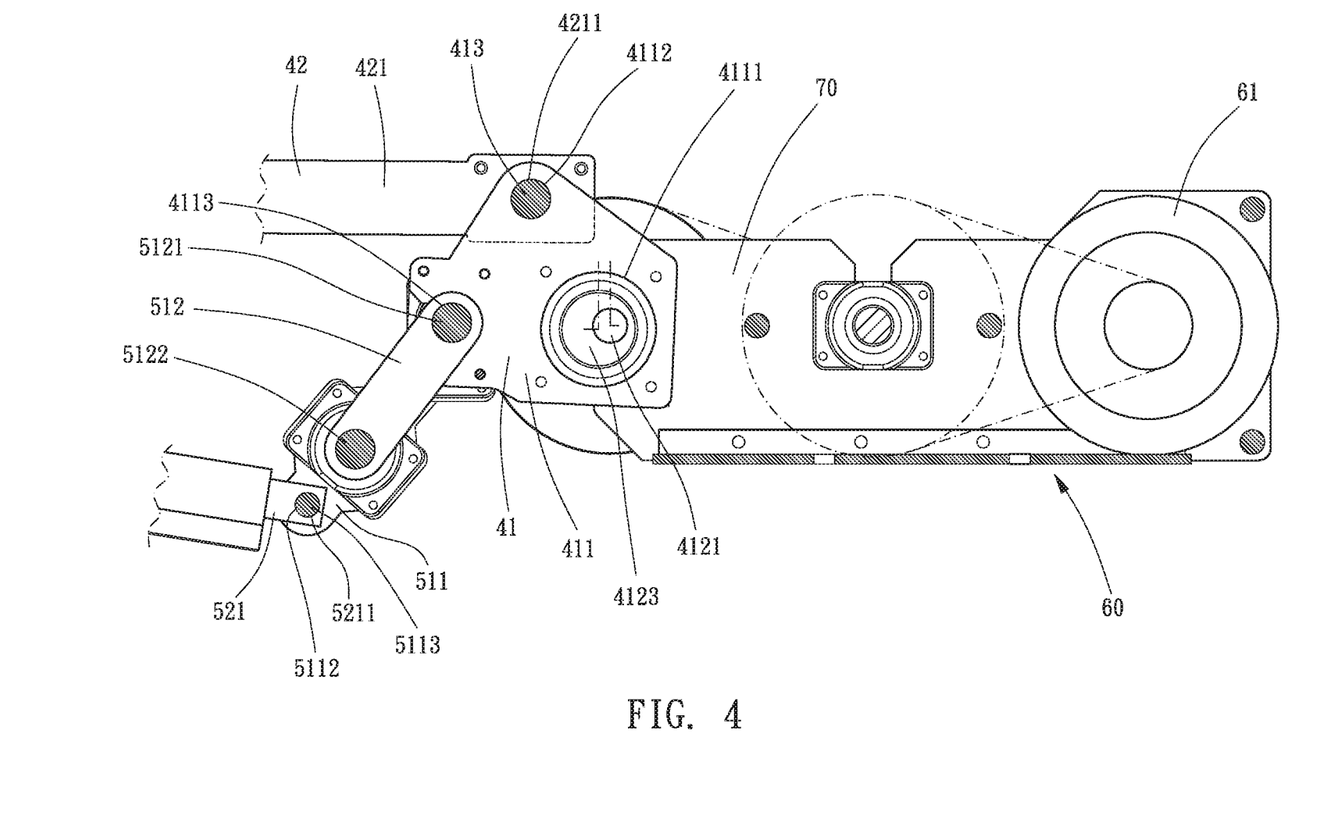
FIG. 4 is a partial enlargement of FIG. 1.

The driven assembly 42 has two first driven members 421 and a second driven member 422. As shown in FIG. 2 to FIG. 4, one end of the first driven member 421 has a driven portion 4211 which is pivotally connected to the second shaking portion 4112 by a bearing, and the other end of the first driven member 421 has a reciprocating portion 4212 which is pivotally connected to one end of the second driven member 422 by a bearing. The other end of the second driven member 422 is disposed on the moving frame 20. Both the driven portion 4211 and the reciprocating portion 4212 are holes.

The adjustment unit 50 has an adjustment assembly 51 and a power member 52. As shown in FIG. 2, the adjustment assembly 51 has two first adjustment members 511 and a second adjustment member 512. One end of the first adjustment member 511 has a fixing portion 5111 which is pivotally connected to the plate member 70 by a bearing, and the other end of the first adjustment member 511 has a first linking portion 5112. Both the fixing portion 5111 and the first linking portion 5112 are holes. The first adjustment member 511 further has a second linking portion 5113 which is an axle, and the first linking portions 5112 of two first adjustment members 511 are connected by the second linking portion 5113. The second adjustment member 512 has a swing portion 5121 and a shifting portion 5122. Both the swing portion 5121 and the shifting portion 5122 are axles. The swing portion 5121 is pivotally connected to the third shaking portion 4113 by a bearing. The shifting portion 5122 is pivotally connected to the first adjustment member 511 by a bearing at the position between the fixing portion 5111 and the first linking portion 5112 of the first adjustment member 511. The power member 52 which is a linear actuator has a stretching portion 521, and the end of the stretching portion 521 has a pushing hole 5211. The second linking portion 5113 of the first adjustment member 511 passes through the pushing hole 5211.

The driving unit 60 includes a motor 61 and two pulley belt sets 62, 62'. As shown in FIG. 2, the motor 61 is connected to the pulley belt set 62, and the pulley belt set 62 is further connected to the pulley belt set 62'. The pulley belt set 62' is connected to one end of the shaft 412.

Two plate members 70 are disposed on the base 10. As shown in FIG. 1 to FIG. 3, two plate members 70 which are parallel to each other are connected by a horizontal plate and several axles to form a space which accommodates the shaking assembly 41, the motor 61, and part of the adjustment assembly 51.

Figure 5:
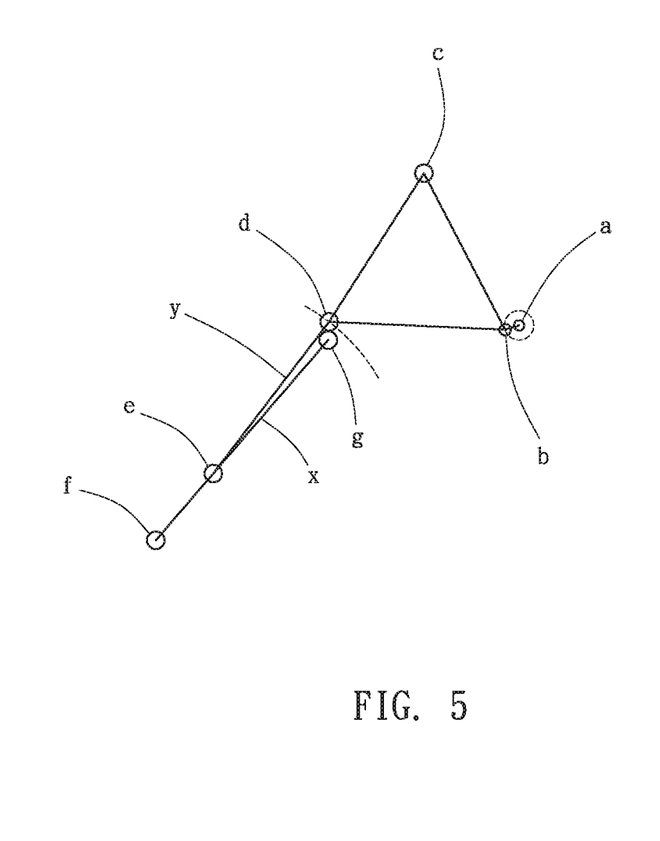
FIG. 5 is a simplified diagram showing the embodiment of FIG. 1.

Please refer to FIG. 5, the reciprocating device is simplified to concisely and clearly describe the motion path of the reciprocating device. As shown in FIG. 2, FIG. 4, and FIG. 5, the point a represents the rotary axis of the rotary section 4121; the point b represents the first shaking portion 4111; the point c represents the second shaking portion 4112, and the point c also represents the driven portion 4211 of the first driven member 421, because the driven portion 4211 which is pivotally connected to the second shaking portion 4112 is synchronized with the second shaking portion 4112; the bar y represents the second adjustment member 512; the point d represents the swing portion 5121 of the second adjustment member 512, and the point d also represents the third shaking portion 4113, because the swing portion 5121 which is pivotally connected to the third shaking portion 4113 is synchronized with the third shaking portion 4113; the point e represents the shifting portion 5122 of the second adjustment member 512; the bar x represents the first adjustment member 511; the point f represents the first linking portion 5112 and the second linking portion 5113 of the first adjustment member 511, and the point f also represents the pushing hole 5211 of the power member 52, because the first linking portion 5112 is connected to the second linking portion 5113 and the second linking portion 5113 which passes through the pushing hole 5211 is synchronized with the pushing hole 5211; the point g represents the fixing portion 5111 of the first adjustment member 511.

Figure 6:
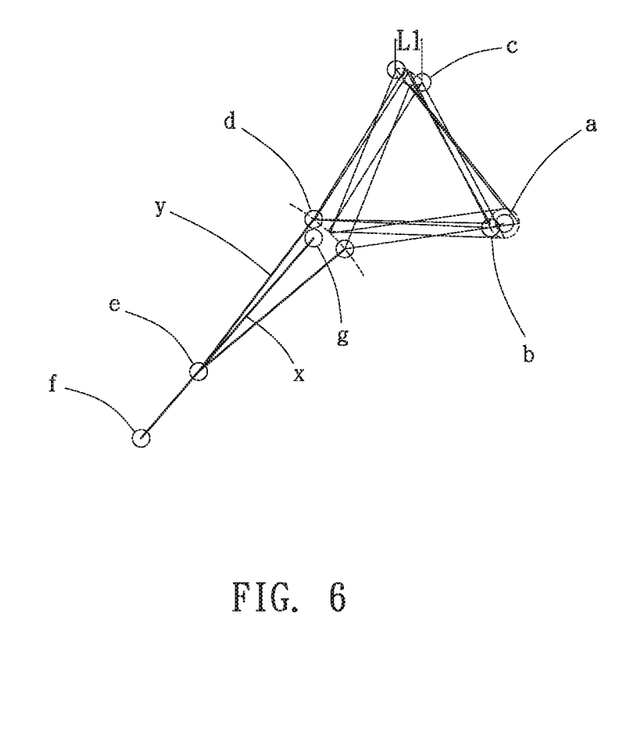
FIG. 6 is a schematic view showing the motion path of the embodiment of FIG. 5.

Please refer to FIG. 5 and FIG. 6. The rotation of the point a enables the point b to perform a circular motion around the point a, and the point b brings the point c and the point d to move. The movement of the point d is limited by the point e, so that the movement of the point d brings the bar y to pivot on the point e. The movement of the point c is affected by the movements of the point b and the point d, so that the motion path of the point c is substantially elliptical.

Figure 9:
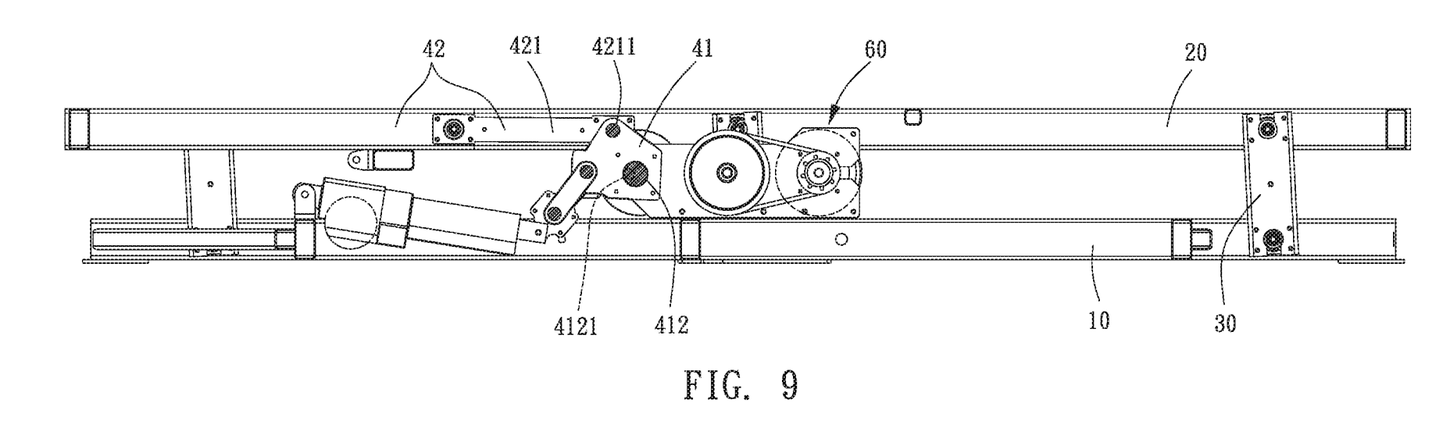
FIG. 9 and FIG. 10 are section views showing the reciprocating process of the embodiment of FIG. 1.
Figure 10:
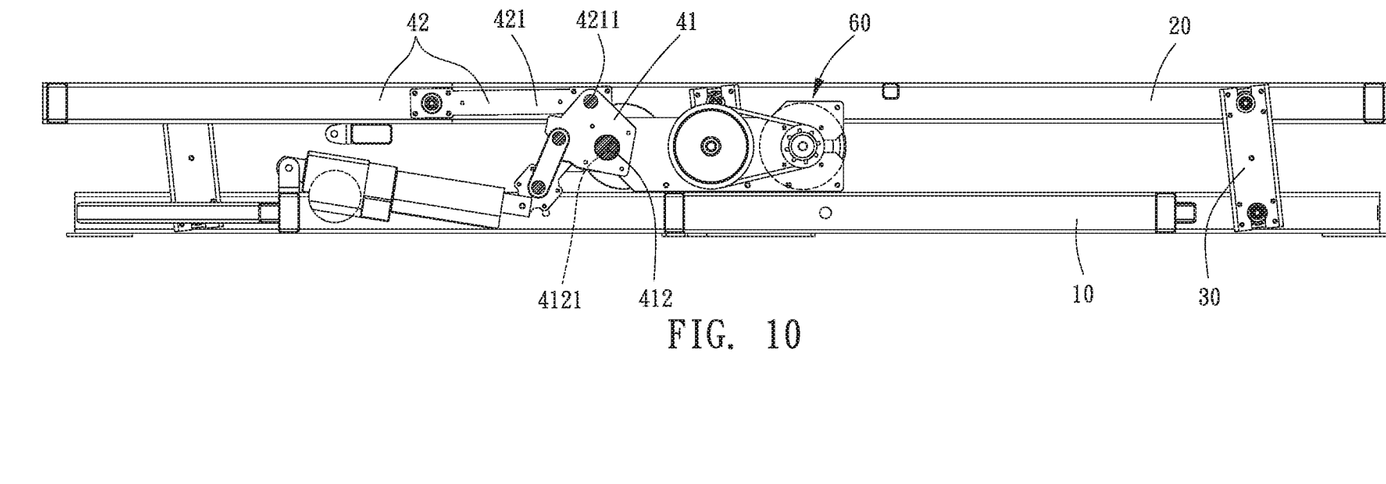

Please refer to FIG. 6, FIG. 9, and FIG. 10, the horizontal length L1 of the motion path of the point c means that the horizontal length of the motion path of the driven portion 4211 is L1, and the movement of the driven portion 4211 can bring the driven assembly 42 to move. Therefore, when the driving unit 60 drives the shaft 412 to rotate eccentrically, the eccentric rotation of the shaft 412 enables the shaking assembly 41 to move the driven assembly 42, and then the movement of the driven assembly 42 brings the moving frame 20 to reciprocate. In addition, the supporting members 30 enable the moving frame 20 to reciprocate relative to the base 10.

Figure 7:
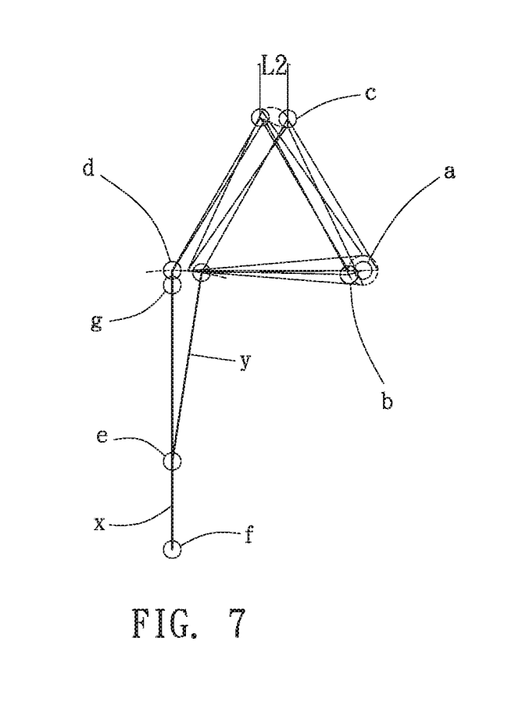
FIG. 7 and FIG. 8 are schematic views showing the adjustment process of the reciprocating range of FIG. 6.
Figure 8:
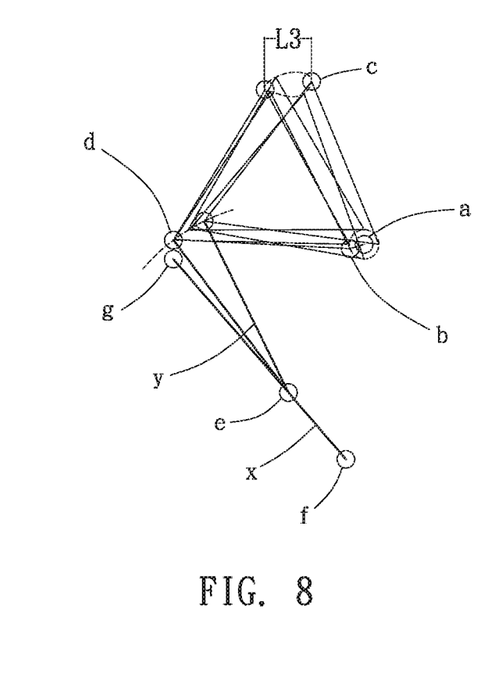

Please refer to FIG. 6 to FIG. 8. The reciprocating range of the moving frame 20 can be adjusted. The movement of the point f brings the bar x to pivot on the point g toward the point b, and the bar x brings the point e to move together. Because the movement of the point d is limited by the point e, the movement of the point e changes the motion path of the point d, so that the motion path of the point c is also changed. When the bar x pivots toward the point b, the horizontal length of the motion path of the point c is changed from L1 to L2, and then to L3. FIG. 6 to FIG. 8 show that L1<L2<L3, that is, the horizontal length of the motion path of the point c is increased when the bar x pivots toward the point b.

Please refer to FIG. 6 to FIG. 8, and FIG. 11. When the stretching portion 521 of the power member 52 stretches to push the adjustment assembly 51, the adjustment assembly 51 pivots toward the underneath of the shaking assembly 41 and alters the way that the shaking assembly 41 shakes, so that the horizontal movement of the driven assembly 42 is increased, and the reciprocating range of the moving frame 20 is also increased. Therefore, a user can increase the reciprocating range of the moving frame 20 by stretching the power member 52.

It should be noted that the vertical movement of the driven portion may also move the moving frame horizontally, but the difference caused by the vertical movement of the driven portion is insignificant, so it is not discussed here.

Figure 11:
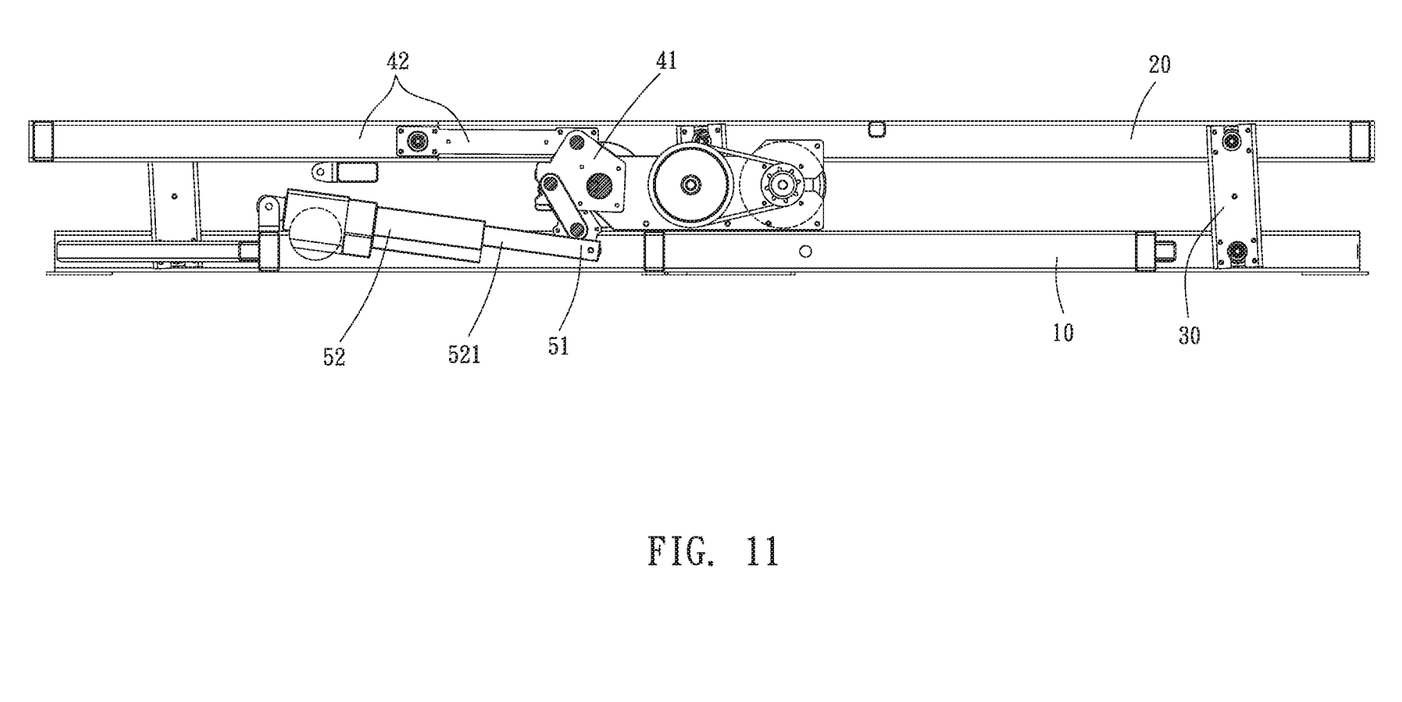
FIG. 11 is a section view showing the embodiment of FIG. 1 after the power member stretches.

As shown in FIG. 9 and FIG. 11, whether the reciprocating range is adjusted or not, the midpoint of the reciprocating path of the moving frame can substantially maintain at the same position. Therefore, the supporting member can still support the moving frame in a substantially upright state rather than an inclined state after the reciprocating range is adjusted. It should be noted that the supporting member may be easily damaged if the supporting member supports the moving frame in an inclined state throughout the whole reciprocating process. Furthermore, in this situation, the motor must spend more power to maintain the movement of the moving frame. However, whether the reciprocating range is adjusted or not, the supporting member of the present invention can supports the moving frame in a substantially upright state, so that the supporting member and the motor can have a longer service life.

In the above embodiment, the supporting member is a rod. In other possible embodiments of the present invention, the supporting member may be a set of two bars and several rollers which are located between the base and the moving frame. The bars are fixed and parallel to the left and right sides of the bottom of the moving frame. Several rollers are fixed to the base and distributed at the upper and lower sides of each bar, so that the bars can reciprocate relative to the base. Therefore, the moving frame can still reciprocate relative to the base.

In view of the above mention embodiments, the present invention provides a reciprocating device whose the reciprocating range can be adjusted. The driving unit enables the shaking assembly to shake, and the shake of the shaking assembly enables the driven assembly to move. The movement of the driven assembly enables the moving frame to reciprocate. In addition, a user can increase the reciprocating range of the moving frame by stretching the power member. The stretching portion of the power member stretches to push the adjustment assembly toward the underneath of the shaking assembly, so that the way that the shaking assembly shakes is altered to increase the horizontal movement of the driven assembly, and then the reciprocating range of the moving frame is increased. Therefore, the moving frame of the present invention can reciprocate and the reciprocating range of the moving frame can be adjusted according to the user's preference, so that the present invention can help a user sleep and improve sleep quality.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A reciprocating device, comprising:
   a base;
   a moving frame, capable of reciprocating relative to the base;
   a shaking unit, having a shaking assembly and a driven assembly, the shaking assembly having a shaft, a first shaking portion, a second shaking portion, and a third shaking portion, the shaft passing through the first shaking portion, the driven assembly being pivotally connected to the second shaking portion, the driven assembly being disposed on the moving frame, shaking of the shaking assembly enabling the driven assembly to move, and movement of the driven assembly enabling the moving frame to reciprocate relative to the base;
   an adjustment unit, having an adjustment assembly and a power member, the adjustment assembly being pivotally connected to the third shaking portion of the shaking assembly, the adjustment assembly being connected to the power member, the power member driving the adjustment assembly to change the position thereof, the positional change of the adjustment assembly altering the way that the shaking assembly shakes to adjust a range that the moving frame reciprocates;
   a driving unit, driving the shaft to rotate, the rotation of the shaft enabling the first shaking portion to move.

2. The reciprocating device of claim 1, wherein the reciprocating device further includes a supporting member, and the supporting member is connected to the base and the moving frame.

3. The reciprocating device of claim 1, wherein the first shaking portion, the second shaking portion, and the third shaking portion are arranged in a triangle.

4. The reciprocating device of claim 1, wherein the shaft is an eccentric shaft, and the rotation of the shaft enables the first shaking portion to perform a circular motion around a rotary axis of the shaft.

5. The reciprocating device of claim 1, wherein the driving unit includes a motor and a pulley belt set.

6. The reciprocating device of claim 1, wherein the power member is a linear actuator.

7. The reciprocating device of claim 6, wherein the reciprocating range of the moving frame is increased when the power member stretches.

8. The reciprocating device of claim 1, wherein the driven assembly has a first driven member and a second driven member, the first driven member is pivotally connected to the second shaking portion and the second driven member, and one end of the second driven member is disposed on the moving frame.

9. The reciprocating device of claim 1, wherein the reciprocating device further includes a plate member, and the adjustment assembly has a first adjustment member and a second adjustment member, the first adjustment member has a fixing portion which is pivotally connected to the plate member and a linking portion which is connected to the power member, and the first adjustment member pivots on the fixing portion when the linking portion is driven by the power member, the second adjustment member has a swing portion which is pivotally connected to the third shaking portion and a shifting portion which is pivotally connected to the first adjustment member, so that the second adjustment member is pivotable on the shifting portion when the shaking assembly shakes, and the first adjustment member brings the shifting portion of the second adjustment member to move together when the first adjustment member pivots on the fixing portion.

10. The reciprocating device of claim 1, wherein the power member can drive the adjustment assembly to pivot toward the bottom of the shaking unit.

* * * * *